(12) United States Patent
Liu

(10) Patent No.: US 10,875,646 B2
(45) Date of Patent: Dec. 29, 2020

(54) HYBRID-POWERED UNMANNED VEHICLE

(71) Applicant: BEIJING RICHENPOWER TECHNOLOGY CO., LTD., Beijing (CN)

(72) Inventor: Jiang Liu, Beijing (CN)

(73) Assignee: BEIJING RICHENPOWER TECHNOLOGY CO., LTD., Beijing (CN)

( * ) Notice: Subject to any disclaimer, the term of this patent is extended or adjusted under 35 U.S.C. 154(b) by 266 days.

(21) Appl. No.: 16/076,674

(22) PCT Filed: Nov. 10, 2017

(86) PCT No.: PCT/CN2017/110529
§ 371 (c)(1),
(2) Date: Aug. 8, 2018

(87) PCT Pub. No.: WO2018/133511
PCT Pub. Date: Jul. 26, 2018

(65) Prior Publication Data
US 2019/0047704 A1     Feb. 14, 2019

(30) Foreign Application Priority Data

Jan. 23, 2017   (CN) .......................... 2017 1 0050276

(51) Int. Cl.
*B64C 39/02* (2006.01)
*B64D 27/24* (2006.01)
*B64D 27/02* (2006.01)

(52) U.S. Cl.
CPC .......... *B64C 39/024* (2013.01); *B64D 27/02* (2013.01); *B64D 27/24* (2013.01);
(Continued)

(58) Field of Classification Search
CPC . B64C 39/024; B64C 2201/024; B64D 27/02; B64D 27/24
(Continued)

(56) References Cited

U.S. PATENT DOCUMENTS 7,279,855 B2 * 10/2007 Tahara ..................... B60K 6/26
318/46
8,296,036 B2 * 10/2012 Matuszeski ............ B64D 31/02
701/99
(Continued)

FOREIGN PATENT DOCUMENTS

CN        104993580 A     10/2015

OTHER PUBLICATIONS

First Office Action of the corresponding Chinese patent application dated May 16, 2018 by SIPO with English Translation thereof.

*Primary Examiner* — David Luo
(74) *Attorney, Agent, or Firm* — Platinum Intellectual Property LLP

(57) ABSTRACT

The present invention relates to a hybrid-powered unmanned vehicle, comprising: a fuel engine (10), a permanent magnet brushless DC motor (20), a rechargeable battery component (30), an startup control circuit (40), an electronic speed regulator, a flight controller, and a propeller. The startup control circuit (40) supplies power from the chargeable battery assembly to the permanent magnet brushless DC motor such that the permanent magnet brushless DC motor drives an operation of the fuel engine. The power generated by the permanent magnet brushless DC motor can charge the rechargeable battery component. When compared to using a battery as sole power supply device, the use of hybrid-power provides greater energy density of up to 1,000-1,500 Wh/kg.

12 Claims, 5 Drawing Sheets

(52) U.S. Cl.
CPC .. *B64C 2201/024* (2013.01); *B64C 2201/042* (2013.01); *B64C 2201/044* (2013.01); *B64D 2027/026* (2013.01)

(58) Field of Classification Search
USPC ..................................................... 318/558, 3
See application file for complete search history.

(56) References Cited

U.S. PATENT DOCUMENTS

| | | | |
|---|---|---|---|
| 9,637,227 B2* | 5/2017 | Von Novak | H02P 3/12 |
| 2016/0137304 A1 | 5/2016 | Phan et al. | |

* cited by examiner

HYBRID-POWERED UNMANNED VEHICLE

RELATED APPLICATIONS

This application is a United States National Stage Application filed under 35 U.S.C 371 of PCT Patent Application Serial No. PCT/CN2017/110529, filed Nov. 10, 2017, which claims Chinese Patent Application Serial No. CN 201710050276.4, filed Jan. 23, 2017, the disclosure of all of which are hereby incorporated by reference in their entirety.

FIELD OF THE INVENTION

The present invention relates to the technical field of unmanned aerial vehicles, and particularly to a hybrid unmanned aerial vehicle.

BACKGROUND OF THE INVENTION

Energy density refers to an amount of energy stored in a matter with a certain space or mass, and a greater energy density represents that more energy can be released in the case of the same mass.

For example, the energy density of an electric supply apparatus, namely a lithium ion battery, used on an existing unmanned aerial vehicle is approximately 150-210 Wh/kg. Due to a limitation of a total weight of the unmanned aerial vehicle itself, a weight of an electric supply apparatus (i.e., the lithium ion battery) installed on a domestic unmanned aerial vehicle is limited. The lithium ion battery can only support a flight of 15 minutes for an unloaded unmanned aerial vehicle or a flight of 32-45 minutes for a fully loaded unmanned aerial vehicle.

In the process of implementing the present invention, the inventor finds that at least the following problems exist in the prior art:

If a lithium ion battery alone is used as an electric supply apparatus of an electric equipment, the energy density thereof is relatively low. If the lithium ion battery alone is used as the electric supply apparatus, a total amount of electric energy output by the electric supply apparatus is relatively small compared to other electric supply apparatuses with the same mass, thereby being not capable of satisfying a long-time duration of the electric equipment.

SUMMARY OF THE INVENTION

In view of this, the main objective of a hybrid unmanned aerial vehicle provided by the present invention is to improve an energy density of an electric supply apparatus.

To achieve the above objective, the present invention mainly provides the following technical solution:

The hybrid unmanned aerial vehicle provided by the present invention includes: a fuel engine; a permanent-magnet DC brushless motor, whose impetus input end is in transmission connection with an impetus output end of the fuel engine; a rechargeable battery component, whose power input end is electrically connected with a power output end of the permanent-magnet DC brushless motor; a startup control circuit, whose power input end is connected with the power input end of the rechargeable battery component and is connected with the power input end of the permanent-magnet DC brushless motor for controlling a start and stop of powering the permanent-magnet DC brushless motor by the rechargeable battery component; the power output end of the permanent-magnet DC brushless motor and/or the power output end of the rechargeable battery component are used as an electric power output interface of an electric supply apparatus; an electronic speed regulator, whose input end is connected with the permanent-magnet DC brushless motor and the rechargeable battery component at the same time; a brushless motor, whose input end is connected with the electronic speed regulator; a flight controller used for controlling a power generation control unit and the electronic speed regulator; and a propeller, whose input end is connected with the brushless motor.

By means of the above technical solutions, the hybrid unmanned aerial vehicle provided by the technical solution of the present invention at least has the following advantages:

In an embodiment provided by the technical solution of the present invention, electricity in the rechargeable battery component is supplied to the permanent-magnet DC brushless motor by the startup control circuit, so that the permanent-magnet DC brushless motor drives the fuel engine to operate, and the fuel engine is ignited to start. After an ignition and startup of the fuel engine, the startup control circuit cuts off an electric supply provided by the rechargeable battery component to the permanent-magnet DC brushless motor, meanwhile the fuel engine drives the permanent-magnet DC brushless motor to generate electricity, the electricity generated by the permanent-magnet DC brushless motor may charge the rechargeable battery component, and the power output end of the permanent-magnet DC brushless motor and/or the power output end of the rechargeable battery component may be used as the electric power output interface of the electric supply apparatus. Compared with an electric supply apparatus with a battery alone, an electric supply apparatus with a petrol-electric hybrid achieves a higher energy density.

The above description is merely an overview of the technical solution of the present invention. In order to understand technical means of the present invention more clearly and implement them in accordance with the contents of the specification, a detailed description is given below through preferred embodiments of the present invention in combination with the drawings.

BRIEF DESCRIPTION OF THE DRAWINGS

Various other advantages and benefits will become apparent to those skilled in the art by reading the following detailed description of the preferred embodiments. The drawings are only for the purpose of illustrating the preferred embodiments and should not be construed as limiting the present invention. Moreover, identical reference signs represent identical components throughout the drawings in which.

DETAILED DESCRIPTION OF THE EMBODIMENTS

To further illustrate the technical means adopted by the present invention to achieve a predetermined invention object and effects thereof, specific embodiments, structures, features and effects of an electric supply apparatus and a powering method thereof and equipment provided in accordance with the present invention will be described in detail below in combination with the drawings and preferred embodiments. In the following description, different "one embodiment" or "an embodiment" does not necessarily refer to the same embodiment. In addition, specific features, structures or characteristics in one or more embodiments may be combined in any suitable form.

The term "and/or" herein is merely an association relation that describes associated objects, and indicates that three relationships may exist, for example, A and/or B may be specifically understood as follows: both A and B may be included, A may exist alone and B may also exist alone, and any of the above three situations may be provided.

Example 1

Figure 1:
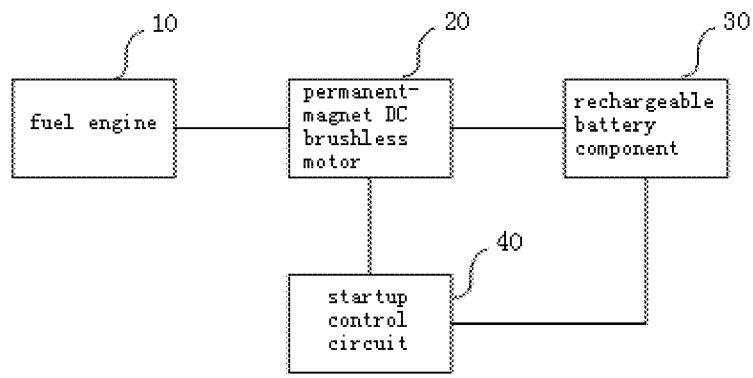
FIG. 1 is an electrical connection structural schematic diagram of an electric supply apparatus used in a hybrid unmanned aerial vehicle provided by an embodiment of the present invention.

As shown in FIG. 1, one embodiment of the present invention provides an electric supply apparatus, for example, an ultra-light portable generator, including:

a fuel engine 10;

a permanent-magnet DC brushless motor 20, whose impetus input end is in transmission connection with an impetus output end of the fuel engine 10;

a rechargeable battery component 30, whose power input end is electrically connected with an power output end of the permanent-magnet DC brushless motor 20;

a startup control circuit 40, whose power input end is connected with the power input end of the rechargeable battery component 30 and is connected with the power input end of the permanent-magnet DC brushless motor 20 for controlling a start and stop of powering the permanent-magnet DC brushless motor 20 by the rechargeable battery component 30;

the power output end of the permanent-magnet DC brushless motor and/or the power output end of the rechargeable battery component is used as an electric power output interface of an electric supply apparatus. That is, the power output end of the permanent-magnet DC brushless motor is used as the electric power output interface of the electric supply apparatus, or the power output end of the rechargeable battery component is used as the electric power output interface of the electric supply apparatus, or the power output end of the permanent magnet DC brushless motor and the power output end of the rechargeable battery component are used as the electric power output interface of the electric supply apparatus;

an electronic speed regulator, whose input end is connected with the permanent-magnet DC brushless motor and the rechargeable battery component at the same time;

a brushless motor, whose input end is connected with the electronic speed regulator;

a flight controller used for controlling a power generation control unit and the electronic speed regulator; and a propeller, whose input end is connected with the brushless motor.

In some embodiments, the fuel engine may be provided with a fuel tank thereon or connected with an external fuel tank. There may be many types of fuel engines, fuels thereof may be selected from gasoline, heavy oil, a mixture of gasoline and lubricating oil, a mixture of heavy oil and lubricating oil, or other similar fuel.

An efficient permanent-magnet brushless motor may be employed as the permanent-magnet DC brushless motor, and a rotating speed of operation and torque characteristic of the permanent-magnet DC brushless motor are matched with those of the fuel engine.

In an embodiment provided by the technical solution of the present invention, electricity in the rechargeable battery component is supplied to the permanent-magnet DC brushless motor by the startup control circuit, so that the permanent-magnet DC brushless motor drives the fuel engine to operate, and the fuel engine is ignited to start. After an ignition and startup of the fuel engine, the startup control circuit cuts off an electric supply provided by the rechargeable battery component to the permanent-magnet DC brushless motor, meanwhile the fuel engine drives the permanent-magnet DC brushless motor to generate electricity, the electricity generated by the permanent-magnet DC brushless motor may charge the rechargeable battery component, and the power output end of the permanent-magnet DC brushless motor and/or the power output end of the rechargeable battery component may be used as the electric power output interface of the electric supply apparatus. Compared with an electric supply apparatus with a battery alone, an electric supply apparatus with a petrol-electric hybrid achieves a higher energy density.

The permanent-magnet DC brushless motor has a longer service life due to a brushless structure. Moreover, the permanent-magnet DC brushless motor may also be used as a starting motor of the fuel engine. The startup control circuit drives the permanent-magnet DC brushless motor so as to start the fuel engine, thereby omitting a starting motor and a speed reduction mechanism in a traditional engine starting system, accordingly, a weight is greatly reduced, a systematic complexity is reduced, and a systematic reliability is improved.

Figure 2:
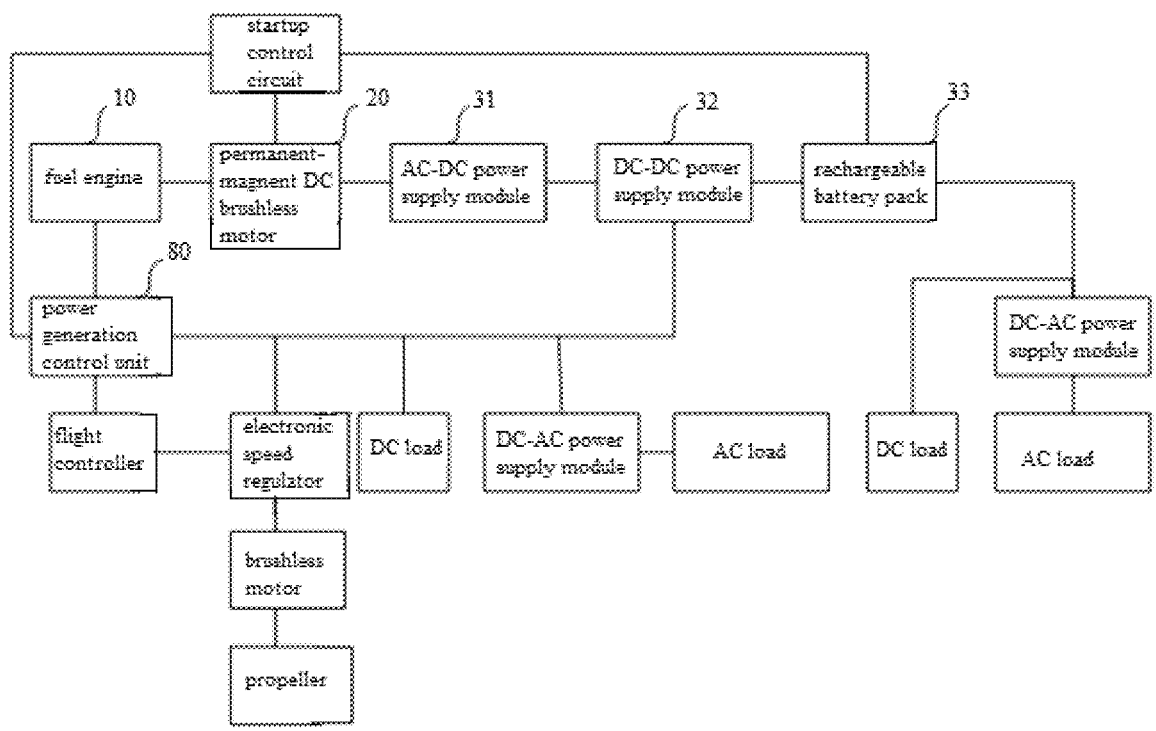
FIG. 2 is an electrical connection structural schematic diagram of a specific hybrid unmanned aerial vehicle provided by an embodiment of the present invention.

As shown in FIG. 2, in the above electric supply apparatus according to a specific implementation, the rechargeable battery component includes an AC-DC power supply module 31, a DC-DC power supply module 32 and a rechargeable battery pack 33;

the power input end of the AC-DC power supply module 31 is electrically connected with the power output end of the permanent-magnet DC brushless motor 20 for converting AC accessing from the permanent-magnet DC brushless motor 20 into DC;

the power input end of the DC-DC power supply module 32 is electrically connected with the power output end of the AC-DC power supply module 31 for performing voltage transformation on the DC accessing from the AC-DC power supply module 31; and the power input end of the rechargeable battery pack 33 is electrically connected with the power output end of the DC-DC power supply module 32.

The AC-DC power supply module, i.e. an AC to DC power supply module, is used for converting the AC sent by the permanent-magnet DC brushless motor into the DC, and the DC-DC power supply module, i.e. a DC voltage-transforming module, is used for performing voltage transformation on the voltage of the DC converted by the AC-DC power supply module and may power the rechargeable battery pack.

When the power output end of the permanent-magnet DC brushless motor and the power output end of the rechargeable battery component are used as the electric power output interface of an electric supply apparatus, a first power output end of the rechargeable battery pack is connected with the power output end of the DC-DC power supply module to serve as a first electric energy output interface after being coupled.

Of course, the rechargeable battery pack may also be employed to supply power alone, and the first power output end of the rechargeable battery pack in the above electric supply apparatus is used as a second electric energy output interface.

Figure 3:
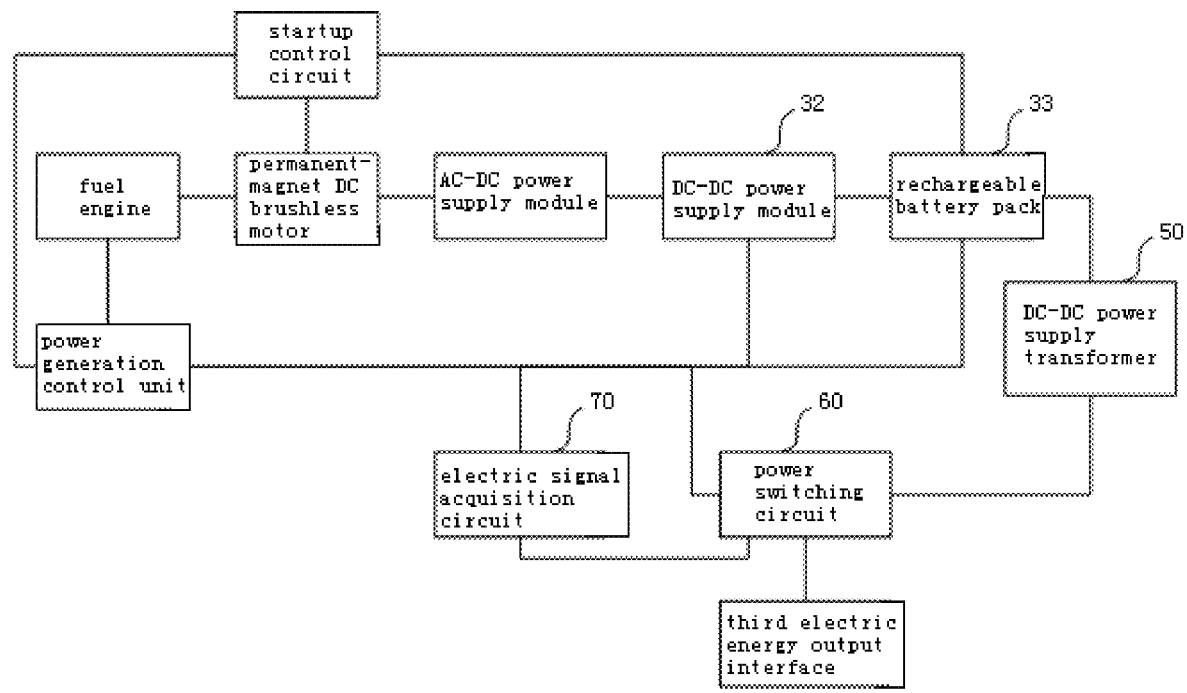
FIG. 3 is an electrical connection structural schematic diagram of another specific hybrid unmanned aerial vehicle provided by an embodiment of the present invention.

In some embodiments, the fuel engine needs to continuously consume fuel during operation, and the permanent-magnet DC brushless motor will no longer output electric energy after the fuel is exhausted, thus the voltage output by the first electric energy output interface will be reduced and may not be able to drive normally a load to operate. For example, if the electric supply apparatus is applied on an unmanned aerial vehicle, after the fuel is exhausted, it is possible that the voltage output by the first electric energy output interface of the electric supply apparatus cannot normally drive a propeller to rotate normally, resulting in a drop of the unmanned aerial vehicle. In order to improve a stability of operation of the electric supply apparatus, the above electric supply apparatus, as shown in FIG. 3, may further include:

a third electric energy output interface, a DC-DC power supply transformer 50, a power switching circuit 60 and an electric signal acquisition circuit 70;

the electric signal acquisition circuit 70 is connected with the power output end of the DC-DC power supply module 32 or the power input end of the DC-DC power supply module for acquiring an electric signal value of the power output end of the DC-DC power supply module 32 or the power input end of the DC-DC power supply module;

the first power output end of the rechargeable battery pack 33 is connected with the power output end of the DC-DC power supply module 32, and is connected with a first electric energy access end of the power switching circuit 60 after being coupled;

the DC-DC power supply transformer 50 is respectively connected with a second power output end of the rechargeable battery pack 33 and a second electric energy access end of the power switching circuit 60 for converting a rated voltage value output by the second power output end of the rechargeable battery pack 33 into a rated voltage value after the first power output end of the rechargeable battery pack 33 and the power output end of the DC-DC power supply module 32 are connected and coupled;

an electric energy output end of the power switching circuit 60 is connected with a third electric energy output interface; and a signal acquisition end of the power switching circuit 60 is connected with the electric signal acquisition circuit 70 for receiving the electric signal value and switching the first electric energy access end of the power switching circuit 60 and the second electric energy access end of the power switching circuit 60 according to a magnitude of the electric signal value.

A specific switching judgment process of the power switching circuit may be as follows: the power switching circuit judges the magnitude of the electric signal value;

when the electric signal value is greater than or equal to a threshold range, the power switching circuit only accesses the electric energy of the first electric energy access end of the power switching circuit, that is, the third electric energy output interface obtains the electric energy after the first power output end of the rechargeable battery pack and the power output end of the DC-DC power supply module are connected and coupled; and when the electric signal value is smaller than the threshold range, the power switching circuit only accesses the electric energy of the second electric energy access end of the power switching circuit, that is, the third electric energy output interface obtains the electric energy only from the first power output end of the rechargeable battery pack.

In some embodiments, the electric signal value may include at least one of a voltage value and a current value.

During an electric supply apparatus powers an electric equipment, the operation working conditions of the electric equipment is not consistent, with loads being sometimes increased and sometimes reduced. In order to guarantee a powering efficiency of the electric supply apparatus, the above electric supply apparatus, as shown in FIG. 2, further includes a power generation control unit 80, and wherein a first signal acquisition end of the power generation control unit 80 is electrically connected with the power output end of the DC-DC power supply module 32 for acquiring a first electric signal output by the power output end of the DC-DC power supply module 32;

a second signal acquisition end of the power generation control unit 80 is electrically connected with the power output end of the rechargeable battery pack 33 for acquiring a second electric signal output by the power output end of the rechargeable battery pack 33; and A control end of the power generation control unit 80 is connected with a throttle actuator of the fuel engine 10 for controlling an operation of the throttle actuator according to the first electric signal and/or the second electric signal.

As a load power may vary, the power generation control unit acquires the electric signal values output by the DC-DC power supply module and the rechargeable battery pack in real time, such as the current values and the voltage values. These two parameters will be used by the power generation control unit to judge the working condition of the electric supply apparatus, and meanwhile the power generation control unit is connected with the fuel engine through the throttle actuator to accurately control a throttle of the fuel engine according to the working condition of the electric supply apparatus, so that the fuel engine always operates in a point of operation with the lowest fuel consumption. The power generation control unit judges the point of operation of the fuel engine by detecting a demand of the load power, and changes the point of operation of the fuel engine by comprehensively adjusting the electric signal value of the working condition of the electric supply apparatus and the throttle of the engine.

Specifically, the first electric signal includes a current information and a voltage information; and the second electric signal includes a current information and a voltage information.

Specifically, the AC-DC power supply module adjusts rectifying parameters according to the working condition of the electric supply apparatus, so that the rectifying efficiency is always maintained above 95%.

Figure 4:
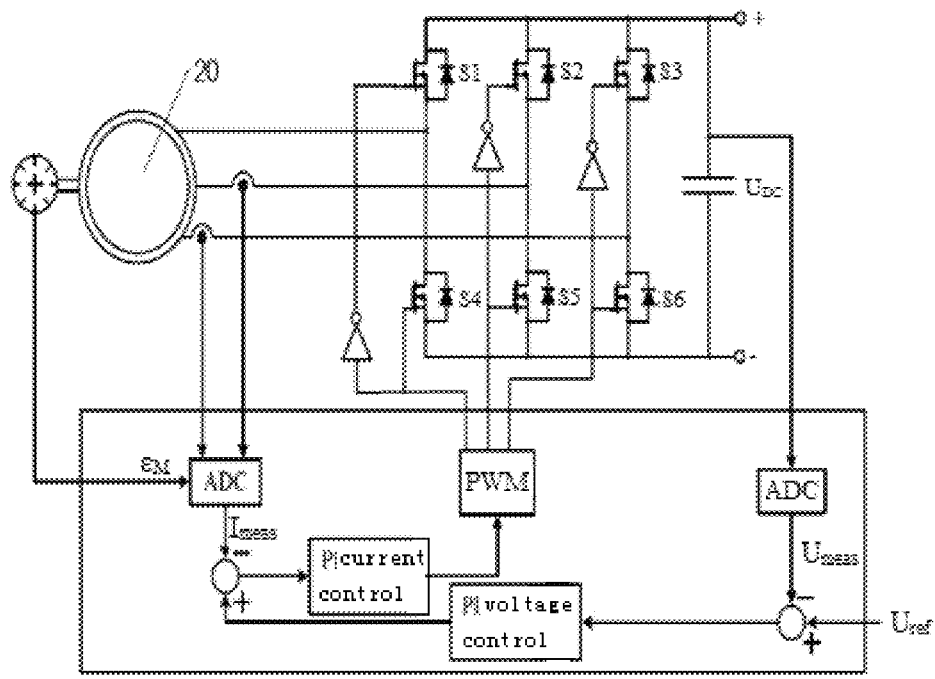
FIG. 4 is an electrical connection structural schematic diagram of a specific AC-DC power supply module provided by an embodiment of the present invention.

As shown in FIG. 4, further, in order to reduce a complexity of a control system software, in the above electric supply apparatus, the AC-DC power supply module includes a rectifying part connected with the power output end of the permanent-magnet DC brushless motor 20, and a pulse width modulation part connected with the permanent-magnet DC brushless motor 20 and the rectifying part respectively;

the rectifying part includes three groups of metal-oxide semiconductor field effect transistors MOSFETs connected with the permanent-magnet DC brushless motor respectively, the three groups of metal-oxide semiconductor field effect transistors MOSFETs are connected in parallel with each other, and each group of metal-oxide semiconductor field effect transistors MOSFETs includes two metal-oxide semiconductor field effect transistors MOSFETs connected in series, wherein A G electrode (gate) of a first metal-oxide semiconductor field effect transistor MOSFET S1 in the first group of metal-oxide semiconductor field effect transistors MOSFETs is connected with a first regulation and control end of a pulse width modulation device PWM of the pulse width modulation part through a first inverting amplifier, and a G electrode (gate) of a second metal-oxide semiconductor field effect transistor MOSFET S2 in the first group of metal-oxide semiconductor field effect transistors MOSFETs is connected with the first regulation and control end of the pulse width modulation device PWM of the pulse width modulation part;

A G electrode of a third metal-oxide semiconductor field effect transistor MOSFET S3 in the second group of metal-oxide semiconductor field effect transistors MOSFETs is connected with a second regulation and control end of the pulse width modulation device PWM of the pulse width modulation part through a second inverting amplifier, and a G electrode of a fourth metal-oxide semiconductor field effect transistor MOSFET S4 in the second group of metal-oxide semiconductor field effect transistors MOSFETs is connected with the second regulation and control end of the pulse width modulation device PWM of the pulse width modulation part; and A G electrode of a fifth metal-oxide semiconductor field effect transistor MOSFET S5 in the third group of metal-oxide semiconductor field effect transistors MOSFETs is connected with a third regulation and control end of the pulse width modulation device PWM of the pulse width modulation part through a third inverting amplifier, and a G electrode of a sixth metal-oxide semiconductor field effect transistor MOSFET S6 in the third group of metal-oxide semiconductor field effect transistors MOSFETs is connected with the third regulation and control end of the pulse width modulation device of the pulse width modulation part.

The AC-DC power supply module is driven by an H-bridge of the permanent-magnet DC brushless motor, which is however not the same as a traditional passive rectification through a diode and a traditional active rectification through an ordinary switching tube. Compared with the traditional passive rectification through the diode, six diodes are replaced by the metal-oxide semiconductor field effect transistors MOSFETs with low on-resistance, therefore, a conduction loss of the metal-oxide semiconductor field effect transistors MOSFETs is greatly reduced in a high-power state, and the systematic efficiency is improved. Compared with the traditional active rectification through the switching tube, a high-power rectifying and power filtering inductance is firstly reduced, thereby reducing the weight of the system, and meanwhile, a reverse driving manner is adopted between upper and lower transistors (between the first metal-oxide semiconductor field effect transistor MOSFET and the second metal-oxide semiconductor field effect transistor MOSFET, between the third metal-oxide semiconductor field effect transistor MOSFET and the fourth metal-oxide semiconductor field effect transistor MOSFET, and between the fifth metal-oxide semiconductor field effect transistor MOSFET and the sixth metal-oxide semiconductor field effect transistor MOSFET), thereby realizing synchronous freewheeling and greatly reducing a power consumption of the system. In addition, another point is a control signal of the whole system, that is, the control signals of three driving half bridges (the first metal-oxide semiconductor field effect transistor MOSFET and the second metal-oxide semiconductor field effect transistor MOSFET constitute a first half bridge; the third metal-oxide semiconductor field effect transistor MOSFET and the fourth metal-oxide semiconductor field effect transistor MOSFET constitute a second half bridge; the fifth metal-oxide semiconductor field effect transistor MOSFET and the sixth metal-oxide semiconductor field effect transistor MOSFET constitute a third bridge) share three paths of PWM pulses, so that the complexity of the control system software is greatly reduced, compared with a conventional sixes paths of PWM pulses.

Figure 5:
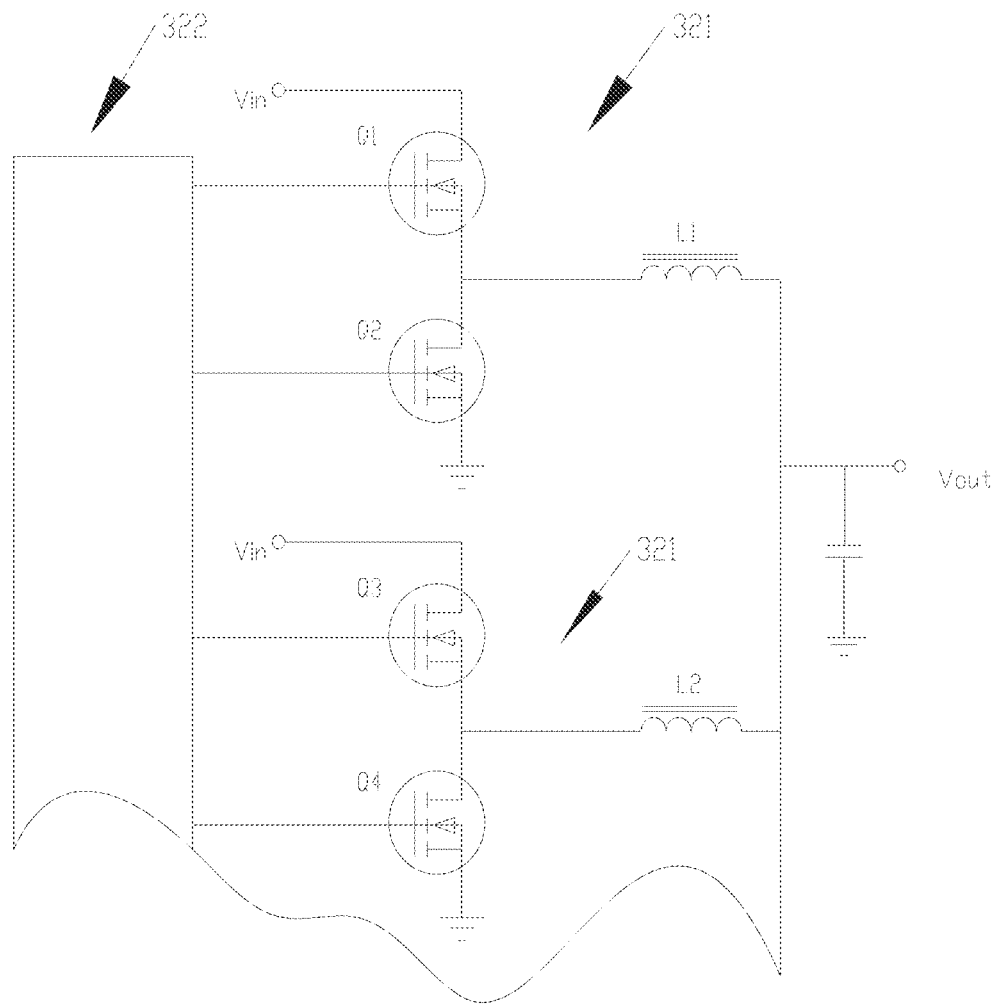
FIG. 5 is an electrical connection structural schematic diagram of a specific DC-DC power supply module provided by an embodiment of the present invention.

Further, as shown in FIG. 5, in the above electric supply apparatus, the DC-DC power supply module includes a plurality of voltage-transforming circuits 321 connected in parallel, and a power of each voltage-transforming circuit 321 is from 400 w to 600 w. Each voltage-transforming circuit is connected to a multiphase controller 322 respectively.

The DC-DC power supply module outputs a rectifying voltage range according to the permanent-magnet DC brushless motor and adopts an active rectifying high-power buck transformation technology. Due to a relatively higher power of the whole hybrid system, a single module is more difficult to achieve such relatively higher power, and heat dissipation is difficult to be guaranteed, therefore, a multiphase interleaving manner is adopted. The power of a single power buck module (the voltage-transforming circuit) is controlled at about 500 W, a higher power output may be achieved by more than three power modules (voltage-transforming circuits) in parallel, and meanwhile a capacitance pulsating current of a rectifying output end may also be reduced. The principle of the multiphase interleaving manner is shown in FIG. 4. Due to an application of the active rectification and the multiphase interleaving, the efficiency of the entire DC-DC power supply module is above 95%.

Specifically, the permanent-magnet DC brushless motor is in transmission connection with the fuel engine through an elastic coupling.

In some embodiments, since the existing moveable generator operates at a state of a fixed rotating speed, an rotating speed of operation of an engine is substantially 3000 rpm according to the 50 Hz frequency of a domestic power supply. Since the engine operates in a state of a low rotating speed, the efficiency of the engine is not high, and a volume and weight of the engine are larger. In order to improve the operating efficiency, in the above electric supply apparatus, rated rotating speeds of the permanent-magnet DC brushless motor and the fuel engine are all from 6000 rpm to 15000 rpm, and energy conversion efficiencies of the permanent-magnet DC brushless motor and the fuel engine are all above 90%.

The fuel engine itself, a non-coaxial connection between the fuel engine and the permanent-magnet DC brushless motor, and an unbalanced mass of a rotor of the permanent magnet-DC brushless motor may all cause the electric supply apparatus to generate vibration, and the vibration will be directly transferred to the electric equipment, affecting a normal operation of the electric equipment. In order to improve the operating stability of the electric equipment, the above electric supply apparatus further includes a mounting bracket and a shock reduction mechanism; and the fuel engine and the permanent-magnet DC brushless motor are disposed on the mounting bracket through the shock reduction mechanism.

During the mounting, the mounting bracket may be mounted on a mounting base of the electric equipment.

The shock reduction mechanism may provide damping between the electric supply apparatus and an external connected equipment (amounting base) to cut off an outward propagation of a vibration and ensure a normal operation of the external connected equipment. For example, an electric equipment, namely, a multi-rotor unmanned aerial vehicle uses an acceleration sensor and a digital gyroscope to judge flight attitude, and these sensors are sensitive to the vibration, however the shock reduction mechanism may ensure normal operations of various sensors of the multi-rotor unmanned aerial vehicle.

It is estimated that the energy density of a lithium iron phosphate battery is approximately 260 Wh/kg. The energy density of a glaze battery is approximately 490 Wh/kg. The energy density of a fuel cell is approximately 1000 Wh/kg. The energy density of the electric supply apparatus in the present invention is approximately 1500 Wh/kg.

Example 2

Figure 6:
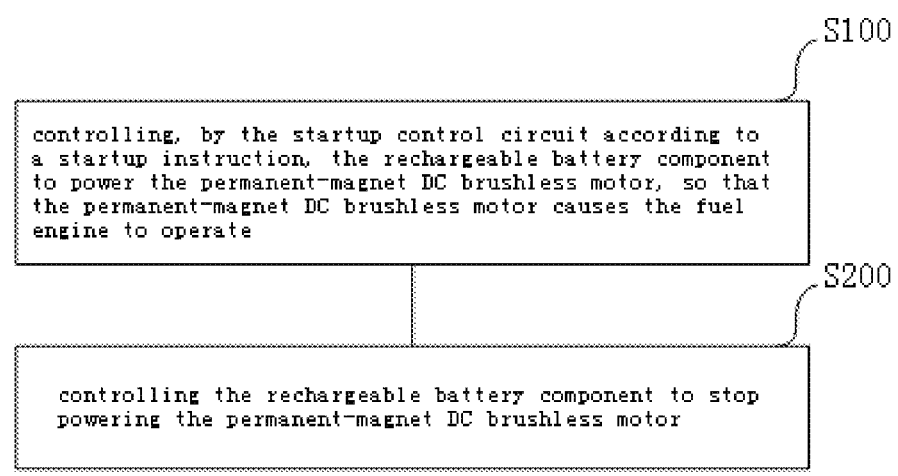
FIG. 6 is a flowchart of steps of a powering method of an electric supply apparatus provided by an embodiment of the present invention.

As shown in FIG. 6, one embodiment of the present invention provides a powering method of an electric supply apparatus, which may be implemented by the electric supply apparatus in any one of the above embodiments, and the method includes:

S100 controlling, by the startup control circuit according to a startup instruction, the rechargeable battery component to power the permanent-magnet DC brushless motor, so that the permanent-magnet DC brushless motor causes the fuel engine to operate; and S200 controlling the rechargeable battery component to stop powering the permanent-magnet DC brushless motor.

In an embodiment provided by the technical solution of the present invention, electricity in the rechargeable battery component is supplied to the permanent-magnet DC brushless motor by the startup control circuit, so that the permanent-magnet DC brushless motor drives the fuel engine to operate, and the fuel engine is ignited to start. After an ignition and startup of the fuel engine, the startup control circuit cuts off an electric supply provided by the rechargeable battery component to the permanent-magnet DC brushless motor, meanwhile the fuel engine drives the permanent-magnet DC brushless motor to generate electricity, the electricity generated by the permanent-magnet DC brushless motor may charge the rechargeable battery component, and the power output end of the permanent-magnet DC brushless motor and/or the power output end of the rechargeable battery component may be used as the electric power output interface of the electric supply apparatus. Compared with an electric supply apparatus with a battery alone, an electric supply apparatus with a petrol-electric hybrid achieves a higher energy density.

Specifically, the powering method of the electric supply apparatus described in the example 2 may directly use the electric supply apparatus provided in the example 1, a specific implementation structure thereof may be seen in the related contents described in the example 1 and will not be repeated herein.

In some embodiments, the unmanned aerial vehicle is selected from any one of a multi-rotor unmanned aerial vehicle with at least three rotors, a tilt-rotor unmanned aerial vehicle with at least two propellers, a fixed-wing unmanned aerial vehicle with at least one propeller, and an unmanned helicopter.

Figure 7:
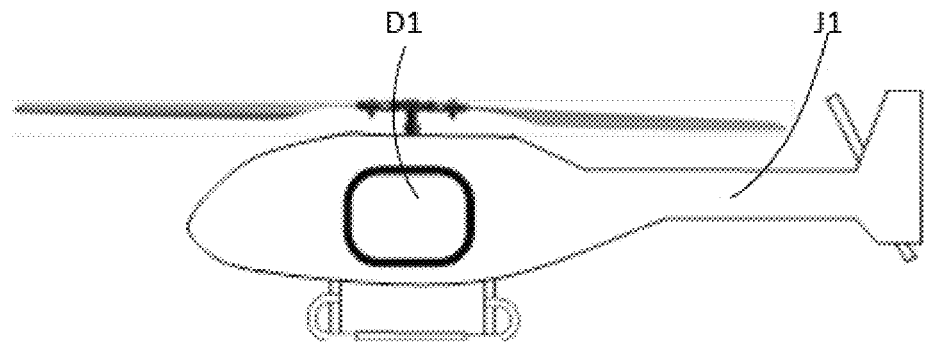
FIG. 7 is a schematic diagram of a disposition manner of an electric supply apparatus provided by an embodiment of the present invention installed inside a body of an unmanned helicopter.
Figure 8:
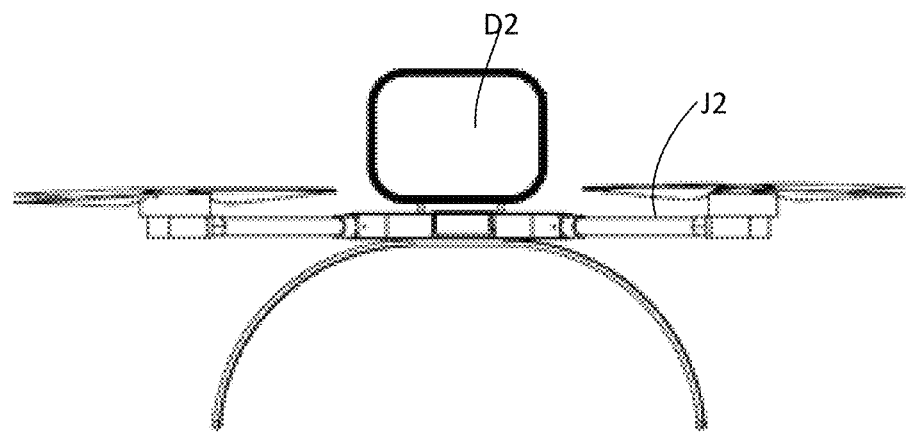
FIG. 8 is a schematic diagram of a disposition manner of an electric supply apparatus provided by an embodiment of the present invention installed above a body of a multi-rotor unmanned aerial vehicle.
Figure 9:
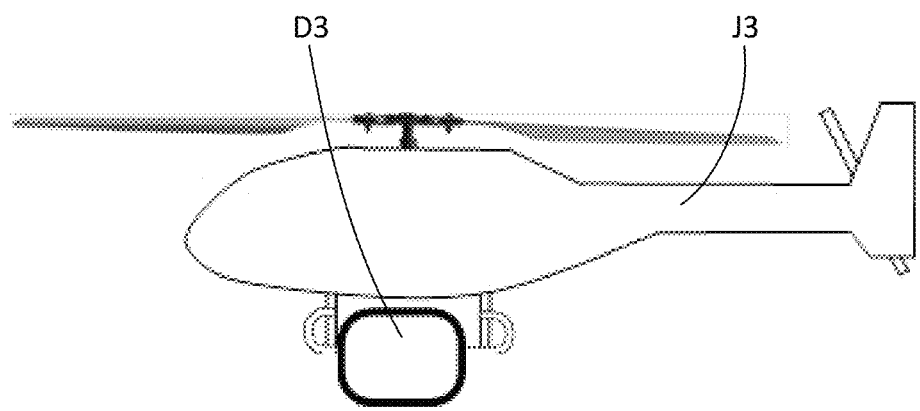
FIG. 9 is a schematic diagram of a disposition manner of an electric supply apparatus provided by an embodiment of the present invention hoisted below a body of an unmanned helicopter.
Figure 10:
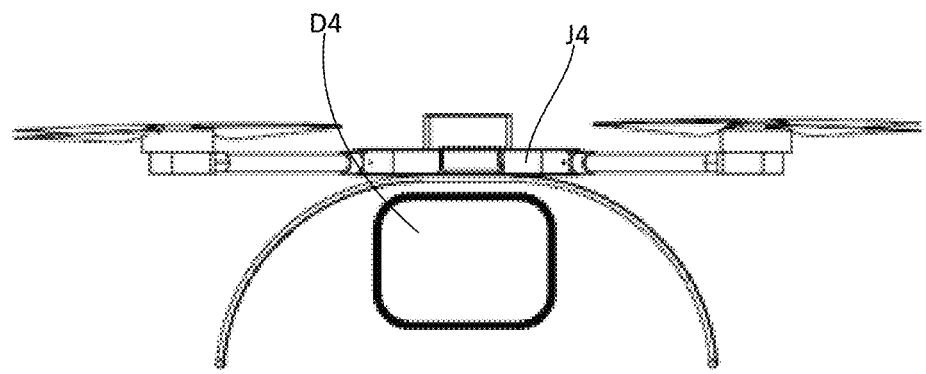
FIG. 10 is a schematic diagram of a disposition manner of an electric supply apparatus provided by an embodiment of the present invention hoisted below a body of a multi-rotor unmanned aerial vehicle.
Figure 11:
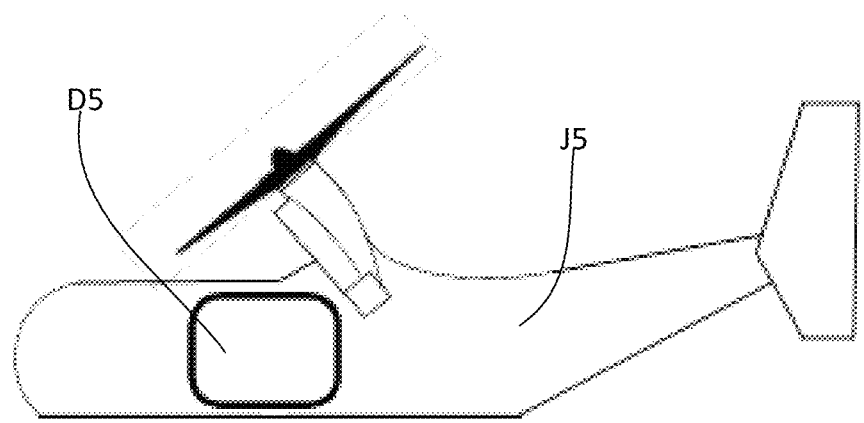
FIG. 11 is a schematic diagram of a disposition manner of an electric supply apparatus provided by an embodiment of the present invention installed inside a body of a tilt-rotor unmanned aerial vehicle.
Figure 12:
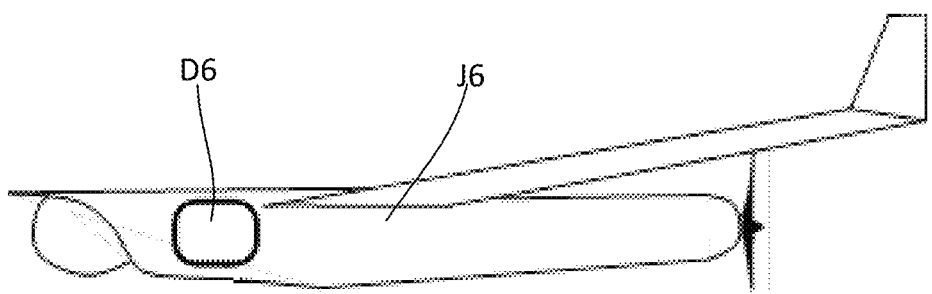
FIG. 12 is a schematic diagram of a disposition manner of an electric supply apparatus provided by an embodiment of the present invention installed inside a body of a fixed-wing unmanned aerial vehicle.

In some embodiments, the fuel engine, the permanent-magnet DC brushless motor, the rechargeable battery component and the startup control circuit constitute an electric supply apparatus, and the electric supply apparatus may be mounted inside a body (as shown in FIG. 7, the electric supply apparatus D1 is mounted inside the body J1 of the unmanned helicopter; as shown in FIG. 11, the electric supply apparatus D5 is mounted inside the body J5 of the tilt-rotor unmanned aerial vehicle; as shown in FIG. 12, the electric supply apparatus D6 is mounted inside the body J6 of the fixed-wing unmanned aerial vehicle), or above the body (as shown in FIG. 8, the electric supply apparatus D2 is mounted above the body J2 of the multi-rotor unmanned aerial vehicle), or hoisted below the body (as shown in FIG. 9, the electric supply apparatus D3 is hoisted below the body J3 of the unmanned helicopter; as shown in FIG. 10, the electric supply apparatus D4 is hoisted below the body J4 of the multi-rotor unmanned aerial vehicle).

In an embodiment provided by the technical solution of the present invention, electricity in the rechargeable battery component is supplied to the permanent-magnet DC brushless motor by the startup control circuit, so that the permanent-magnet DC brushless motor drives the fuel engine to operate, and the fuel engine is ignited to start. After an ignition and startup of the fuel engine, the startup control circuit cuts off an electric supply provided by the rechargeable battery component to the permanent-magnet DC brushless motor, meanwhile the fuel engine drives the permanent-magnet DC brushless motor to generate electricity, the electricity generated by the permanent-magnet DC brushless motor may charge the rechargeable battery component, and the power output end of the permanent-magnet DC brushless motor and/or the power output end of the rechargeable battery component may be used as the electric power output interface of the electric supply apparatus. Compared with an electric supply apparatus with a battery alone, an electric supply apparatus with a petrol-electric hybrid achieves a higher energy density.

Specifically, the electric supply apparatus described in the example 3 may directly adopt the electric supply apparatus provided in the example 1, a specific implementation structure thereof may be seen in the related contents described in the example 1 and will not be repeated herein.

In the above embodiments, the description of each embodiment has its own emphasis. For a part that is not described in detail in one embodiment, reference may be made to a relevant description in other embodiments.

It may be understood that related features in the above apparatuses may refer to each other. In addition, the words "first", "second" and the like in the above embodiments are used for distinguishing various embodiments and do not represent how well the various embodiments are.

In the specification provided herein, many specific details are illustrated. However, it can be understood that the embodiments of the present invention may be practiced without these specific details. In some instances, well-known structures and techniques are not shown in detail in order not to obscure the understanding of the present specification.

Similarly, it should be understood that, in order to simplify the present disclosure and help to understand one or more of various aspects of the invention, various features of the present invention are sometimes grouped together into a single embodiment, diagram or description thereof in the above description of exemplary embodiments of the present invention. However, the disclosed apparatus should not be interpreted as reflecting the intention that the present invention sought for protection requires more features than those expressly recited in each claim. Or rather, as reflected in the following claims, an aspect of the invention has less than all features of a single embodiment disclosed above. Thus, the claims following specific embodiments are hereby expressly incorporated into specific embodiments, and each claim is used as a single embodiment of the present invention.

Those skilled in the art may understand that components in an apparatus in the embodiments may be adaptively changed and provided in one or more apparatuses different from the present embodiment. The components in the embodiments may be combined into one component, and moreover they may be divided into a plurality of subcomponents. Except for at least some of such features that are mutually exclusive, all features disclosed in the specification (including the appended claims, abstract and drawings), as well as all components of any apparatus so disclosed, may be combined in any combination manner. Each feature disclosed in the specification (including the appended claims, abstract and drawings) may be replaced by alternative features serving the same, equivalent or similar purpose, unless expressly stated otherwise.

In addition, those skilled in the art can understand that although some embodiments described herein include certain features included in other embodiments rather than other features, a combination of features of different embodiments is meant to be within the scope of the present invention and form different embodiments. For example, in the following claims, any of the claimed embodiments may be used in any combination mode. Various component embodiments of the present invention may be implemented in hardware or by a combination thereof.

It should be noted that the above embodiments illustrate the present invention rather than limiting the present invention, and those skilled in the art may design alternative embodiments without departing from the scope of the appended claims. In the claims, any reference signs placed between parentheses should not be construed as limiting the claims. The word "including" does not exclude the presence of elements or components not listed in the claims. The word "a" or "an" before an element or component does not exclude the presence of a plurality of such elements or components. The present invention may be implemented by means of an apparatus including several different components. In claims listing several components, several of these components may be embodied by a same component item. The use of the words first, second, third and the like do not denote any order. These words may be interpreted as names.

The above description is merely exemplary embodiments of the present invention and does not impose any limitation on the present invention. Any simple modifications, equivalent alterations and modifications to the above embodiments according to the technical essence of the present invention still belong to the scope of the technical solution of the present invention.

The invention claimed is:

1. A hybrid unmanned aerial vehicle, comprising:
a fuel engine;
a permanent-magnet DC brushless motor, whose impetus input end is in transmission connection with an impetus output end of the fuel engine;
a rechargeable battery component, whose power input end is electrically connected with a power output end of the permanent-magnet DC brushless motor;
a startup control circuit, whose power input end is connected with the power input end of the rechargeable battery component and is connected with the power input end of the permanent-magnet DC brushless motor for controlling a start and stop of powering the permanent-magnet DC brushless motor by the rechargeable battery component;
the power output end of the permanent-magnet DC brushless motor and/or the power output end of the rechargeable battery component are used as an electric power output interface of an electric supply apparatus;
an electronic speed regulator, whose input end is connected with the permanent-magnet DC brushless motor and the rechargeable battery component at the same time;
a brushless motor, whose input end is connected with the electronic speed regulator;
a flight controller used for controlling a power generation control unit and the electronic speed regulator; and
a propeller, whose input end is connected with the brushless motor;
wherein the rechargeable battery component comprises an AC-DC power supply module, a DC-DC power supply module and a rechargeable battery pack;
the power input end of the AC-DC power supply module is electrically connected with the power output end of the permanent-magnet DC brushless motor for converting AC accessing from the permanent-magnet DC brushless motor into DC;
the power input end of the DC-DC power supply module is electrically connected with the power output end of the AC-DC power supply module for performing voltage transformation on the DC accessing from the AC-DC power supply module; and
the power input end of the rechargeable battery pack is electrically connected with the power output end of the DC-DC power supply module;

a first power output end of the rechargeable battery pack is connected with the power output end of the DC-DC power supply module to serve as a first electric energy output interface after being coupled;

the first power output end of the rechargeable battery pack is used as a second electric energy output interface;

the hybrid unmanned aerial vehicle further comprising a third electric energy output interface, a DC-DC power supply transformer, a power switching circuit and an electric signal acquisition circuit and wherein the electric signal acquisition circuit is connected with the power output end of the DC-DC power supply module or the power input end of the DC-DC power supply module for acquiring an electric signal value of the power output end of the DC-DC power supply module or the power input end of the DC-DC power supply module;

a first power output end of the rechargeable battery pack is connected with the power output end of the DC-DC power supply module, and is connected with a first electric energy access end of the power switching circuit after being coupled;

the DC-DC power supply transformer is respectively connected with a second power output end of the rechargeable battery pack and a second electric energy access end of the power switching circuit for converting a rated voltage value output by the second power output end of the rechargeable battery pack into a rated voltage value after the first power output end of the rechargeable battery pack and the power output end of the DC-DC power supply module are connected and coupled;

an electric energy output end of the power switching circuit is connected with the third electric energy output interface; and a signal acquisition end of the power switching circuit is connected with the electric signal acquisition circuit for receiving the electric signal value and switching the first electric energy access end of the power switching circuit and the second electric energy access end of the power switching circuit according to a magnitude of the electric signal value.

2. The hybrid unmanned aerial vehicle according to claim 1, further comprising a power generation control unit, wherein a first signal acquisition end of the power generation control unit is electrically connected with the power output end of the DC-DC power supply module for acquiring a first electric signal output by the power output end of the DC-DC power supply module;

a second signal acquisition end of the power generation control unit is electrically connected with the power output end of the rechargeable battery pack for acquiring a second electric signal output by the power output end of the rechargeable battery pack; and a control end of the power generation control unit is connected with a throttle actuator of the fuel engine for controlling an operation of the throttle actuator according to the first electric signal and/or the second electric signal.

3. The hybrid unmanned aerial vehicle according to claim 2, wherein the first electric signal comprises a current information and a voltage information; and the second electric signal comprises a current information and a voltage information.

4. The hybrid unmanned aerial vehicle according to claim 1, wherein the AC-DC power supply module comprises a rectifying part connected with the power output end of the permanent-magnet DC brushless motor, and a pulse width modulation part connected with the permanent-magnet DC brushless motor and the rectifying part respectively;

the rectifying part comprises three groups of metal-oxide semiconductor field effect transistors MOSFETs connected with the permanent-magnet DC brushless motor respectively, and the three groups of metal-oxide semiconductor field effect transistors MOSFETs are connected in parallel with each other, and each group of metal-oxide semiconductor field effect transistors MOSFETs comprises two metal-oxide semiconductor field effect transistors MOSFETs connected in series, wherein, a G electrode of a first metal-oxide semiconductor field effect transistor MOSFET in the first group of metal-oxide semiconductor field effect transistors MOSFETs is connected with a first regulation and control end of a pulse width modulation device of the pulse width modulation part through a first inverting amplifier, and a G electrode of a second metal-oxide semiconductor field effect transistor MOSFET in the first group of metal-oxide semiconductor field effect transistors MOSFETs is connected with the first regulation and control end of the pulse width modulation device of the pulse width modulation part;

a G electrode of a third metal-oxide semiconductor field effect transistor MOSFET in the second group of metal-oxide semiconductor field effect transistors MOSFETs is connected with a second regulation and control end of the pulse width modulation device of the pulse width modulation part through a second inverting amplifier, and a G electrode of a fourth metal-oxide semiconductor field effect transistor MOSFET in the second group of metal-oxide semiconductor field effect transistors MOSFETs is connected with the second regulation and control end of the pulse width modulation device of the pulse width modulation part; and a G electrode of a fifth metal-oxide semiconductor field effect transistor MOSFET in the third group of metal-oxide semiconductor field effect transistors MOSFETs is connected with a third regulation and control end of the pulse width modulation device of the pulse width modulation part through a third inverting amplifier, and a G electrode of a sixth metal-oxide semiconductor field effect transistor MOSFET in the third group of metal-oxide semiconductor field effect transistors MOSFETs is connected with the third regulation and control end of the pulse width modulation device of the pulse width modulation part.

5. The hybrid unmanned aerial vehicle according to claim 1, wherein the DC-DC power supply module comprises a plurality of voltage-transforming circuits connected in parallel, and a power of each voltage-transforming circuit is from 400 w to 600 w.

6. The hybrid unmanned aerial vehicle according to claim 1, wherein the permanent-magnet DC brushless motor is in transmission connection with the fuel engine through an elastic coupling;

preferably, rated rotating speeds of the permanent-magnet DC brushless motor and the fuel engine are all from 6000 rpm to 15000 rpm;

preferably, the hybrid unmanned aerial vehicle further comprises a mounting bracket and a shock reduction mechanism; and the fuel engine and the permanent-magnet DC brushless motor are disposed on the mounting bracket through the shock reduction mechanism;

preferably, the unmanned aerial vehicle is selected from any one of a multi-rotor unmanned aerial vehicle with at least three rotors, a tilt-rotor unmanned aerial vehicle with at least two propellers, a fixed-wing unmanned aerial vehicle with at least one propeller and an unmanned helicopter;

preferably, the fuel engine, the permanent-magnet DC brushless motor, the rechargeable battery component and the startup control circuit constitute the electric supply apparatus, and the electric supply apparatus is mounted inside the body or above the body, or hoisted below the body.

7. The hybrid unmanned aerial vehicle according to claim 1, further comprising a power generation control unit, a first signal acquisition end of the power generation control unit is electrically connected with the power output end of the DC-DC power supply module for acquiring a first electric signal output by the power output end of the DC-DC power supply module;

a second signal acquisition end of the power generation control unit is electrically connected with the power output end of the rechargeable battery pack for acquiring a second electric signal output by the power output end of the rechargeable battery pack; and a control end of the power generation control unit is connected with a throttle actuator of the fuel engine for controlling an operation of the throttle actuator according to the first electric signal and/or the second electric signal.

8. The hybrid unmanned aerial vehicle according to claim 7, wherein the first electric signal comprises a current information and a voltage information; and the second electric signal comprises a current information and a voltage information.

9. The hybrid unmanned aerial vehicle according to claim 1, further comprising a power generation control unit, a first signal acquisition end of the power generation control unit is electrically connected with the power output end of the DC-DC power supply module for acquiring a first electric signal output by the power output end of the DC-DC power supply module;

a second signal acquisition end of the power generation control unit is electrically connected with the power output end of the rechargeable battery pack for acquiring a second electric signal output by the power output end of the rechargeable battery pack; and a control end of the power generation control unit is connected with a throttle actuator of the fuel engine for controlling an operation of the throttle actuator according to the first electric signal and/or the second electric signal.

10. The hybrid unmanned aerial vehicle according to claim 9, wherein the first electric signal comprises a current information and a voltage information; and the second electric signal comprises a current information and a voltage information.

11. The hybrid unmanned aerial vehicle according to claim 1, further comprising a power generation control unit, a first signal acquisition end of the power generation control unit is electrically connected with the power output end of the DC-DC power supply module for acquiring a first electric signal output by the power output end of the DC-DC power supply module;

a second signal acquisition end of the power generation control unit is electrically connected with the power output end of the rechargeable battery pack for acquiring a second electric signal output by the power output end of the rechargeable battery pack; and a control end of the power generation control unit is connected with a throttle actuator of the fuel engine for controlling an operation of the throttle actuator according to the first electric signal and/or the second electric signal.

12. The hybrid unmanned aerial vehicle according to claim 11, wherein the first electric signal comprises a current information and a voltage information; and the second electric signal comprises a current information and a voltage information.

* * * * *